United States Patent [19]

Yokoyama

[11] 4,267,459
[45] May 12, 1981

[54] METHOD OF OPERATING A HYDRAULIC TURBINE OR A PUMP-TURBINE

[75] Inventor: Toshiaki Yokoyama, Hitachi, Japan

[73] Assignee: Hitachi, Ltd., Tokyo, Japan

[21] Appl. No.: 42,346

[22] Filed: May 25, 1979

[30] Foreign Application Priority Data

May 26, 1978 [JP] Japan .................................. 53-63732

[51] Int. Cl.³ .............................................. F02N 11/04
[52] U.S. Cl. .......................................... 290/52; 415/1
[58] Field of Search .................. 415/500, 1; 290/1 R, 290/52, 54, 43

[56] References Cited

U.S. PATENT DOCUMENTS

| | | | |
|---|---|---|---|
| 3,309,057 | 3/1967 | Onooka | 415/1 |
| 3,403,888 | 10/1968 | Hartland | 415/1 |
| 3,533,709 | 10/1970 | Wicli | 415/1 |
| 3,658,436 | 4/1972 | Oishi et al. | 415/1 |
| 4,014,624 | 3/1977 | Takase et al. | 415/500 |

Primary Examiner—J. V. Truhe
Assistant Examiner—John W. Redman
Attorney, Agent, or Firm—Thomas E. Beall, Jr.

[57] ABSTRACT

A method of operating a hydraulic turbine in which, when the hydraulic turbine is operated so as to shift the load from the watered condition at guide vanes closed to the generating operation area in a condition that the runner rotates in the turbine rotating direction, the hydraulic machine is temporarily disconnected from the electric power system thereby to decrease the revolution per minute and to allow the load to smoothly shift from the motoring operation to the power generation operation in the version of the hydraulic machine characteristic, and under this condition, the guide vane is gradually opened to set the revolution per minute to a given value, and then the hydraulic machine is recoupled with the electric power system for gaining the load.

7 Claims, 3 Drawing Figures

METHOD OF OPERATING A HYDRAULIC TURBINE OR A PUMP-TURBINE

BACKGROUND OF THE INVENTION

The invention relates to a method of operating a hydraulic turbine or a pump-turbine (referred to as a hydraulic machine).

A hydraulic power plant, which generally generates electric power and pumps up the stored water, is frequently used to improve the power factor of the electric power system by operating a motor-generator as a synchronous condenser. In the synchronous condenser operation mode, the water level in the draft tube is moved down by using compressed air to let the runner rotate in air for the purpose of reducing the rotation loss of the runner. In a water turbine generator, the power output may readily be adjusted by merely opening or closing the guide vane, unlike a steam turbine generator. For this reason, the water turbine generator is used for adjusting the load of an electric power system. When the water turbine generator is running in the synchronous condenser operation mode in the above-mentioned manner, that is to say, by moving down the water level in the draft tube by compressed air to decrease the input, in a hydraulic power station, if a load condition of the power system suddenly changes, the synchronous condenser operation mode of the generator must be changed to a power generation mode. How to effect such an operation mode change is the important and pressing problem to immediately be solved in this field.

There has been used a mode of changing the synchronous condenser operation mode to the power generation mode in the hydraulic power station including a pumped storage power station.

In the operation mode changing method from condensor to generating the air in the draft tube and the runner chamber is firstly exhausted and then water is filled into them. Then, when the pressure within the runner chamber exceeds a predetermined value, the guide vane is opened to allow supply of necessary electric power to the electric power system. In the synchronous condenser operation mode, the runner rotates in the direction of the turbine rotation and the generator is coupled with the electric power system. Therefore, the power may be supplied to the electric power system by merely exhausting air within the runner chamber and then opening the guide vanes.

In a recent power station equipped with small sized and high speed machines, when the synchronous condenser operation mode is changed over to the power generation mode, the hydraulic machine sometimes enters a motoring region in the term of the machine characteristic because of its hydrodynamic characteristic, with the result that it does not act as a generator to generate electric power but as a motor to consume electric power. The consumed electric power by the machine temporarily reaches the approximately 50% of the maximum output. In such a situation, the operation of the hydraulic machine becomes unstable with excessive vibration and noise.

SUMMARY OF THE INVENTION

Accordingly, an object of the invention is to provide a method of operating a hydraulic machine for preventing the hydraulic machine from entering the motoring region because of its hydraulic characteristic when the machine operation mode is changed over from the synchronous condenser operation mode to the power generation mode.

Another object of the invention is to provide a method of operating a hydraulic machine for eliminating an abnormal operation such as an excessive motoring input or abnormal vibration, probably occurring when the motoring operation is changed over to the power generation operation in the terms of the machine characteristic.

On the basis of the results of various experiments conducted, the method of operating a hydraulic machine according to the invention is to temporarily disconnect it from an electric power system and decrease the rotational speed to an operating point which is free from an S-characteristic. In this way, the hydraulic machine is smoothly shifted from the motoring operation area to the power generation operation area in terms of the machine characteristic.

When considering the tendency of high speed of the hydraulic machine, the operating system thus constructed is very effective when it is applied to such a machine, because the S-characteristic area is very close to the rating operating point.

DESCRIPTION OF THE PREFERRED EMBODIMENT

Figure 1:
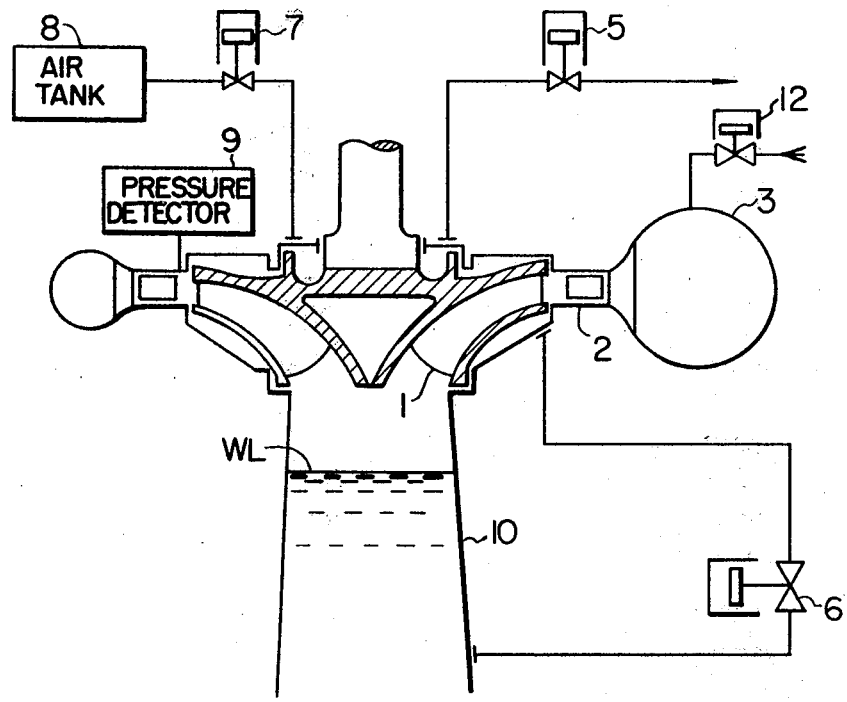
FIG. 1 shows a longitudinal cross sectional view of a hydraulic machine to which the invention is applied.

Reference is made to FIG. 1 for illustrating a hydraulic machine operating in a synchronous condenser operation mode. In the figure, reference numeral 1 denotes a runner; 2 a guide vane; 3 a casing; 5 an air exhaust valve; 6a drainage valve; 7 an air charging valve; 8 an air tank; 9 a pressure detector; 10 a draft tube; and 12 is an electromagnet operated main inlet valve. In the synchronous condenser operation state, the water surface in the draft tube 10 is moved down to the level denoted as WL by the compressed air supplied from the air tank 8. In this condition, the runner 1 rotates in air with a lesser rotation loss than that when it rotates in water.

Under this condition, when a command of power generation is issued, the air is exhausted from the runner chamber while the guide vane 2 is closed. As a result, the water level WL rises so that the runner chamber is filled with water. This state is called a watered condition at guide vanes closed. In this state, when the guide vanes 2 are opened, the hydraulic machine shifts its operation mode to the power generation mode.

When a generator included in the hydraulic machine is coupled with the electric power system, the generator does not supply electric power to the electric power system but temporarily receives electric power from the power system, as mentioned above.

Figure 2:
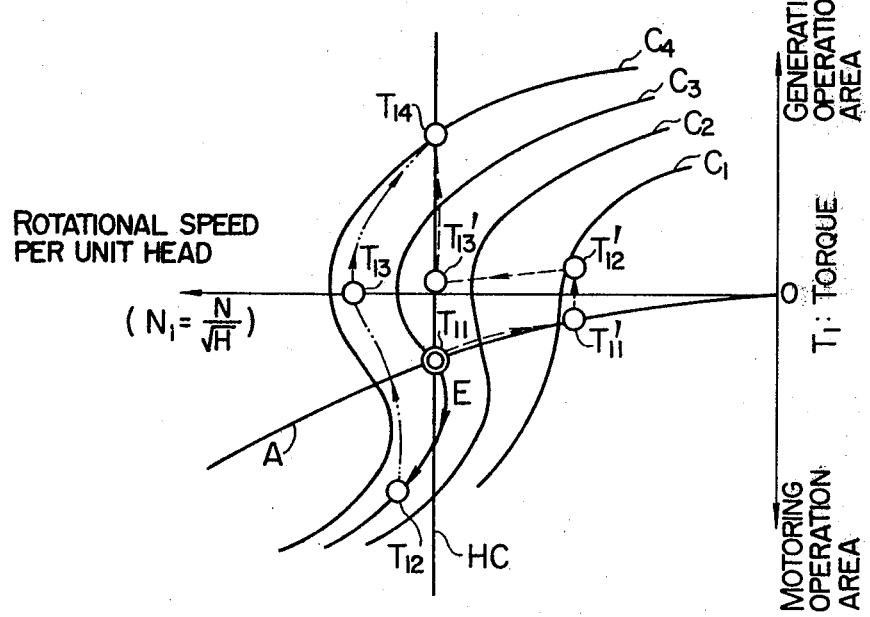
FIG. 2 shows a graph illustrating a hydraulic machine characteristic in which the X-coordinate axis represents a speed per unit head and the Y-coordinate represents a torque, and which is useful in explaining an abnormal phenomena and the principle of the present invention.

This will be described in detail with reference to FIG. 2. In the figure, the abscissa represents a rotational speed per unit head denoted as $N_1$ and the ordinate a torque $T_1$. Here $N_1 = N/\sqrt{H}$, where N is a rotational speed of generator, and H is a head. In the graphs as shown in FIG. 2, A designates a torque characteristic curve in the watered condition at guide vanes closed, HC is a head characteristic curve at synchronous speed when the machine is coupled to the power system, and $C_1$ to $C_4$ guide vane opening curves each representing a relationship between $N_1$ and $T_1$ at a given opening of the guide vane. The opening of the guide vane becomes larger in the order of the curves $C_1$ to $C_4$. When the guide vane starts being opened at a point $T_{11}$ representative of the watered condition at guide vanes closed, the characteristic of the hydraulic machine is traced as an S-shaped curve crossing at three points a head characteristic curve HC traced with a given value of $N_1$ in parallel with the ordinate of $T_1$, as indicated by the curve $C_3$. This hydraulic machine curve is called an S-characteristic in this specification. At the starting stage of the machine in watered condition of vanes closed, when the guide vanes are opened the inertia of the water in the runner or a water conduit raises the head until the water flows through the machine. Because of this, the head of the hydraulic machine rises, that is to say, the rotational speed per unit head $N_1$ becomes small since $N_1 = N/\sqrt{H}$. Accordingly, the hydraulic machine exhibits the characteristic following a path $T_{11} \rightarrow E$, i.e. $T_{11} \rightarrow T_{12} \rightarrow T_{13} \rightarrow T_{14}$. Thus, when the generator is coupled with the power system, an abnormal motoring input ($\frac{1}{2}$ or $\frac{1}{3}$ input of a necessary full load) takes place at point on curve HC corresponding to point $T_{12}$ to disturb a load condition of the power system, thereby causing an abnormal vibration. The prior art has the just-mentioned defect.

According to the present invention, when it is desired to change the operation mode from that of watered condition at guide vanes closed to power generation coupled with the power system, the hydraulic machine is disconnected from the electric power system at point $T_{11}$. When the hydraulic machine is separated from the power system, it decreases its speed along curve A, because it is in the watered condition at guide vanes closed and has a reactive torque. That is, $N_1$ is decreased and the operating point of the hydraulic machine shifts from point $T_{11}$ to point $T_{11'}$.

At this operating point $T_{11'}$, the characteristic curve becomes a characteristic curve (not shown), which is substantially the same as shown by the curve $C_1$, loosing its S-shape. Under this condition at point $T_{11}$, the guide vanes are gradually opened so that the machine characteristic moves from point $T_{11'}$ to point $T_{12'}$ so as to produce a torque of the generating operation. After this, the guide vanes are opened further so that the hydraulic machine traces a path $T_{12'} \rightarrow T_{13'}$ and when the speed of the machine reaches a speed synchronous with the power system at curve HC, the machine is coupled with the power system, thus smoothly gaining the load.

This method may save the time for the machine to follow a path $T_{11'} \rightarrow 0 \rightarrow (stop) \rightarrow T_{12'}$. Incidentally, when the operating point shifts from $T_{11}$ to $T_{11'}$, the guide vane may be in fully closed condition or in a slightly open condition after it is gradually opened.

Figure 3:
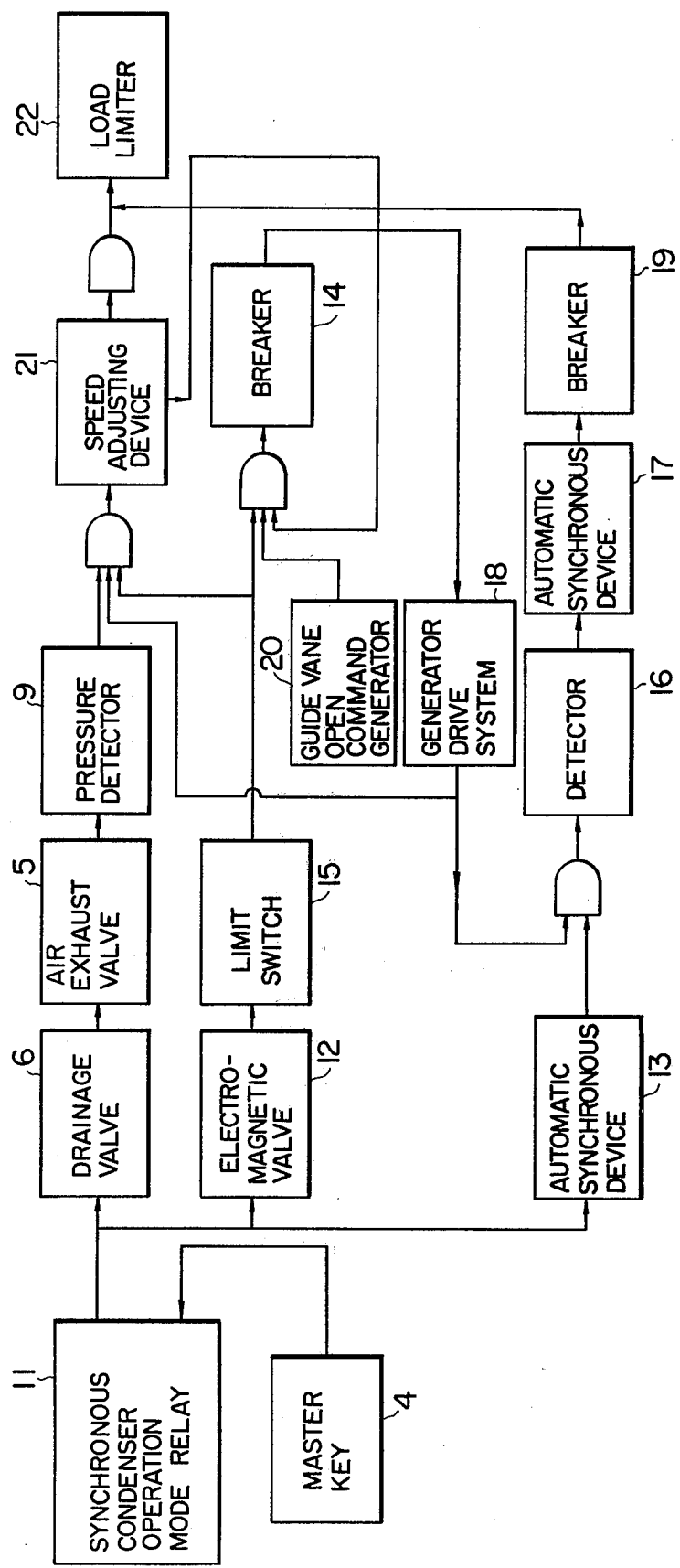
FIG. 3 shows a block diagram of an embodiment of the method of operating a hydraulic machine according to the invention.

An embodiment of the controls of the machine operating method according to the invention will be described with referring to FIGS. 1 to 3.

In the synchronous condenser operation mode, the water level within the draft tube 10 is held down by the compressed air supplied from the air tank 8, as shown in FIG. 1, and the runner rotates in air, lessening the rotation loss. Also at this time, the drainage valve 6 is open to permit the water leaking through the closed guide vanes to pass into the draft tube, thus alleviating the runner loss.

A command is issued to change from the synchronous condenser operation to the power generation operation. Upon the issuance of the command, the master key 4 (FIG. 3) is switched over from the synchronous condenser operation mode to the power generation mode. As a result, a synchronous condenser operation mode relay 11 is turned on to close the drainage valve 6, to turn on an electromagnetic operated main inlet valve, to close air charging valve 7, and to lock out an automatic synchronous device 13. After the drainage valve 6 is fully closed, the exhaust valve 5 is opened so that the air in the draft tube and the runner chamber is exhausted and the machine becomes in the watered condition at guide vanes closed. The watered condition is detected by means of a pressure switch 9. The cross point of the curve HC and the curve A at this time corresponds to the operating point $T_{11}$ (FIG. 2). If the guide vanes are opened at this time for the purpose of effecting the power generating operation, the S-characteristic of curve $C_3$ moves the operating point in the motoring operation area because of the above-mentioned reduction in $N_1$ to consume an excessive amount of electric power. This undesirable situation may be avoided by decreasing $N_1$ to an operating point adjacent curve $C_1$ not exhibiting the S-shape characteristic, i.e. point $T_{11'}$. The decreasing of $N_1$ is made by disconnecting the electric power system through the opening of a breaker 14. Incidentaly, the opening of the breaker results in the deceleration of the rotational speed due to the runner rotation loss in the water. As described above, when the operation mode change command is produced, the electromagnetic operated main inlet valve 12 is turned to fully open in preparation for the power generating operation. The fully opened inlet valve turns on the limit switch 15. The full opening of the inlet valve, the full closing of the drainage valve 6, the turning on of a guide vane open command generator 20, and the stop of a speed adjusting device 21 fully condition a breaker 14 to open, with the result that the generator is disconnected from the electric power system and at the same time a generator electrical drive or excitation system 18 is turned off. As a result, it is prevented to generate an excessive voltage in the generator. Simultaneous with the disconnection of the breaker 14, the rotational speed of the turbine generator is rapidly decelerated due to the runner rotation loss up to the point $T_{11'}$ on a curve not exhibiting the S-shape characteristic. The decrease of the speed is detected by the detector 16. The detector 16 may be replaced by a timer to measure a time from a point of time when the breaker 14 is disconnected. After the generator operation reaching the operating point $T_{11'}$ is detected, the guide vanes are opened to provide the curve $C_1$ so that the characteristic of the turbine generator changes from the torque characteristic curve A to the guide vane opening curve $C_1$ and thus the operating point shifts from $T_{11'}$ to $T_{12'}$. As a result, the generator operation enters the operating region of the generating operation. At this time, the automatic synchronous device 17 is turned on and the turbine generator is accelerated up to the synchronous speed by adjusting the opening of the guide vanes to shift from $C_1$ to curve $C_2$, etc. At a point of time when the voltage, the rotational speed, and the phase coincide with those of the power system, the breaker 19 is turned on. This point of time is denoted as $T_{13'}$. After the breaker 19 is turned on, by gradually opening the guide vanes, the operating point passes through the cross point of the head characteristic curve HC and each guide vane opening curve to reach the full load operating point $T_{14}$.

As described above, in the recent hydraulic machine where the area of S-characteristic is extremely close to the rating operating point, the hydraulic machine operating method may smoothly change the operation mode from the synchronous condenser operation mode to the power generation mode without occurrence of the motoring.

I claim:

1. A method of operating a hydraulic turbine-generator machine in a power system in which, when the hydraulic turbine is operated so as to shift the load from the watered condition at guide vanes closed to the generating operation area in a condition that the runner rotates in the turbine rotating direction, the hydraulic machine is temporarily disconnected from the electric power system thereby to decrease the revolution per minute and to allow the load to smoothly shift from the motoring operation to the power generation operation at the decreased speed, and under this condition, the guide vane is gradually opened to increase the speed and set the revolution per minute to a fixed value, and then the hydraulic machine is recoupled with the electric power system for gaining the load.

2. A method according to claim 1, wherein a generator electrical excitor of the machine is turned off simultaneous with said disconnection of the hydraulic machine from the electric power system.

3. A method according to claim 1 or 2, wherein said fixed value is the number of revolutions per minute of the hydraulic machine that is in synchronism with the electric power system.

4. A method of operating a hydraulic turbine-generator machine in a power system, where the turbine is of the type that exhibits S-shaped guide vane characteristic curves for different guide vane openings in an area of operation as plotted on a graph of torque versus speed-/$\sqrt{}$head, in which, when the hydraulic turbine is operated so as to shift the load from the watered condition at guide vanes closed to the generating operation area in a condition that the runner rotates in the turbine rotating direction, the hydraulic machine is temporarily disconnected from the electric power system thereby to decrease the revolution per minute and to allow the load to smoothly shift from the motoring operation to the power generation operation, an operation area of decreased speed outside said S-shaped characteristic curves area, and under this condition, the guide vane is gradually opened to increase the speed and to set the revolution per minute to a fixed value, and then the hydraulic machine is recoupled with the electric power system for gaining the load.

5. A method according to claim 4, wherein a generator electrical excitor of the machine is turned off simultaneous with said disconnection of the hydraulic machine from the electric power system.

6. A method according to claim 4, wherein said fixed value is the number of revolutions per minute of the hydraulic machine that is in synchronism with the electric power system.

7. A method according to claim 6, wherein a generator electrical excitor of the machine is turned off simultaneous with said disconnection of the hydraulic machine from the electric power system.

* * * * *